United States Patent
Rothermel

(10) Patent No.: US 6,335,511 B1
(45) Date of Patent: Jan. 1, 2002

(54) CONTROL METHOD AND APPARATUS FOR AN ARC WELDING SYSTEM

(75) Inventor: Ronald R. Rothermel, Pollock Pines, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 0 days.

(21) Appl. No.: 09/547,996

(22) Filed: Apr. 12, 2000

Related U.S. Application Data

(60) Provisional application No. 60/128,802, filed on Apr. 12, 1999.

(51) Int. Cl.[7] .............................................. B23K 9/09
(52) U.S. Cl. ........................... 219/130.51; 219/124.03; 219/130.31
(58) Field of Search ................... 219/130.31, 130.51, 219/124.02, 124.03, 125.12, 130.21, 137 PS, 130.33

(56) References Cited

U.S. PATENT DOCUMENTS

| | | |
|---|---|---|
| 2,516,777 A | 7/1950 | Knight et al. |
| 3,071,680 A | 1/1963 | Anderson et al. |
| 3,337,769 A | 8/1967 | Buchanan |
| 3,364,334 A | 1/1968 | Sato et al. |
| 3,530,359 A | 9/1970 | Grist |
| 3,614,377 A | 10/1971 | Stearns et al. |
| 3,683,149 A | 8/1972 | Mages et al. |
| 3,694,621 A * | 9/1972 | Wofsey ................. 219/124.03 |
| 3,728,516 A | 4/1973 | Daspit |
| 3,818,176 A | 6/1974 | Brown |
| 3,832,522 A | 8/1974 | Arikawa et al. |
| 3,896,287 A | 7/1975 | Cook |
| 3,904,846 A | 9/1975 | Risberg |
| 3,906,184 A | 9/1975 | Gibbs et al. |
| 3,912,980 A | 10/1975 | Crump et al. |
| 3,956,610 A | 5/1976 | Kanbe et al. |
| 4,019,016 A | 4/1977 | Friedman et al. |
| 4,092,517 A | 5/1978 | Woodacre |
| 4,151,395 A | 4/1979 | Kushner et al. |
| 4,152,759 A | 5/1979 | Hedberg |
| 4,159,409 A | 6/1979 | Hedberg |
| 4,300,035 A | 11/1981 | Johansson |
| 4,301,355 A | 11/1981 | Kimbrough et al. |
| 4,319,124 A | 3/1982 | Johansson |
| 4,320,282 A | 3/1982 | McDonald et al. |
| 4,322,602 A | 3/1982 | Grist |
| 4,336,440 A | 6/1982 | Cook et al. |
| 4,349,720 A | 9/1982 | Makimaa |
| 4,409,465 A | 10/1983 | Yamamoto et al. |
| 4,427,874 A | 1/1984 | Tabata et al. |
| 4,438,317 A | 3/1984 | Ueguri et al. |
| 4,442,337 A | 4/1984 | Nakata et al. |
| 4,477,713 A | 10/1984 | Cook et al. |
| 4,531,192 A | 7/1985 | Cook |
| 4,544,825 A | 10/1985 | Cook |
| 4,594,498 A | 6/1986 | Ueguri et al. |

(List continued on next page.)

FOREIGN PATENT DOCUMENTS

| | | |
|---|---|---|
| DE | 28 42 496 A1 | 4/1980 |
| JP | A-62-259674 | 11/1987 |
| JP | A-4-84672 | 3/1992 |
| RU | 742064 | 6/1980 |

*Primary Examiner*—Clifford C. Shaw
(74) *Attorney, Agent, or Firm*—Bacon & Thomas

(57) ABSTRACT

An arc welding control method and apparatus includes a voltage control loop in which a pulsation parameter such as pulse width, pulse amplitude, background amplitude between pulses, or frequency, is adjusted to compensate for deviations in the arc voltage, and a second, slower feedback loop which adjusts a second parameter of the system in order to cause the pulsation parameter to return to a desired value as a result of the effect of the adjusted second parameter on the arc voltage.

57 Claims, 4 Drawing Sheets

U.S. PATENT DOCUMENTS

| | | |
|---|---|---|
| 4,620,082 A | 10/1986 | Graville et al. |
| 4,631,385 A | 12/1986 | Rothermel |
| 4,650,957 A | 3/1987 | Cullen et al. |
| 4,758,707 A | 7/1988 | Ogilvie et al. |
| 4,794,232 A | 12/1988 | Kimbrough et al. |
| 4,952,773 A | 8/1990 | Orsos et al. |
| 5,130,514 A | 7/1992 | Kugai et al. |
| 5,157,236 A | 10/1992 | Batzler et al. |
| 5,293,027 A | 3/1994 | Strumpf |
| 5,525,778 A | 6/1996 | Matsui et al. |

\* cited by examiner

CONTROL METHOD AND APPARATUS FOR AN ARC WELDING SYSTEM

This application claims benefit of Prov. No. 60/128,802 filed Apr. 12, 1999.

BACKGROUND OF THE INVENTION

1. Field of the Invention

This invention relates to an apparatus and method for controlling a welding parameter in an arc welding system. More particularly, the invention relates to an apparatus and method for adjusting the frequency or some other parameter of pulses applied to an electrode of an arc welding system in response to changes in the arc voltage, and for returning the pulse frequency or other pulsation parameter to a desired value by varying a further parameter. In an illustrated example of the invention, the arc welding system is a consumable electrode arc welding system, the pulsation parameter may be the pulse frequency, and the further parameter that is varied to return the pulsation parameter to the desired value is the distance between a workpiece and the consumable electrode or an electrical connection element for the consumable electrode, such as a contact tip. The invention may also have applicability to pulsed arc welding systems which use non-consumable electrodes.

2. Description of Related Art

It is well-known to control the arc in an arc welding system by varying the power supplied to an electrode to compensate for changes in the arc voltage as a result of changes in the distance between the workpiece and the electrode or the contact tip that supplies power to the electrode. Such changes occur because of variations in workpiece contour as the torch moves along a weld path, or misalignment of torch travel relative to the workpiece, and must be rapidly compensated in order to ensure good weld quality.

One way to compensate for arc voltage deviations caused by changes in the distance between workpiece and the electrode or contact tip is to mechanically move the electrode or contact tip in response to changes in the arc voltage. In the case of a consumable electrode system, it is the contact tip that is moved, the electrode being arranged in sliding engagement with the contact tip and fed at a constant rate. An example of such a proximity controller is described in U.S. Pat. No. 4,631,385 (Rothermel)

Another way to compensate for variations in the distance between the contact tip and the workpiece is to adjust an electrical parameter of the power supplied to the electrode, such as the average current, or in the case of pulsed currents, the peak and/or base amplitudes, width, or shape of waveforms supplied to the contact tip in response to changes in the arc voltage. Examples of current control based on the arc voltage are found in U.S. Pat. No. 3,614,377 Stearns), U.S. Pat. No. 3,896,287 (Cook), and U.S. Pat. No. 3,904,846 (Risberg), with the Stearns and Cook patents being directed to pulse width modulation control of constant current arc welding power supplies, and the Risberg patent disclosing adaptive control of both the pulse width and interval of the arc welding current. Such systems are effective in controlling the overall burn off rate, but only so long as the adjusted parameter is kept within relatively narrow limits since the weld quality, particularly in pulsed arc welding systems, is highly sensitive to the current amplitude and waveform. For example, too low a current or too short a pulse width will cause globular and intermittent metal transfer with attendant spatter. Detailed descriptions of the considerations involved in selecting a suitable waveform are described in a number of the U.S. patents cited herein.

The present invention is particularly directed to an arc welding control system of the type in which power to the contact tip is in the form of pulses and the pulse frequency is controlled based on changes in voltage between the contact tip and the workpiece. Such systems are known, for example, from U.S. Pat. No. 4,409,465 (Yamamoto), U.S. Pat. No. 4,427,874 (Tabata et al.), U.S. Pat. No. 4,620,082 (Graville), and U.S. Pat. No. 4,758,707 (Ogilvie). However, as in other conventional current or pulse control systems, the conventional pulse frequency controls are limited so a relative narrow adjustment range and cannot be used where the variations in arc voltage are likely to cause the adjusted parameter to deviate beyond an acceptable range. Since the pulse frequency is a critical parameter in pulsed consumable electrode arc welding systems, variation in the pulse frequency based on arc voltage has not been widely utilized, despite the simplicity and accuracy of frequency controllers in general.

The present invention solves this problem by adding a control loop which returns the adjusted parameter to a desired value by adjusting the contact tip-to-workpiece distance. This action also restores the contact tip-to-workpiece distance back to its original or intended value, which further guarantees that gas coverage and electrode stick-out (i.e., the distance between the end of the contact tip and the arc) remains constant. As will be discussed below, the use of an additional, proximity based control loop to return a deviating parameter to its original or desired value is known from U.S. Pat. No. 4,794,232 (Kimbrough et al.).

Before discussing the Kimbrough et al. patent, the conventional pulse frequency control system will be described. FIG. 1, shows the basic elements of a conventional arc welding system of the type which uses a torch to which is supplied a consumable electrode as the source of welding material. During welding, a voltage is applied between the contact tip 1 and a workpiece 2, and the consumable electrode 3 is continuously fed from a spool 4 towards the workpiece by rollers 5 driven by a motor 6 at a rate corresponding to the rate that material is burned off the tip of the electrode 3 by the applied voltage, so that a constantly controlled amount of material is deposited as the torch is moved along the weld. A feed rate controller 7 is used to regulate the feed rate in accordance with commands entered manually or by computer via input 8. Power to the electrode is provided by a weld power source 9 that delivers electrical power to the electrode via the sliding contact tip 1.

In this type of consumable electrode arc welding system, the arc voltage is a function of the distance between the contact tip and the workpiece, while the overall rate of burn off of the consumable electrode is determined by the applied voltage and current, i.e., by the power applied to the electrode. In order to compensate for increases or decreases in the torch-to-work distance and/or arc length, and thereby maintain a constant burn off rate, some conventional pulsed arc welding systems proportionally increase or decrease the power supplied to the contact tip by varying a nominal pulse frequency input 10 based on feedback from a voltage sensor 11. Adder 12 compares the voltage sensor feedback with the desired arc voltage input 13 and the resulting difference signal is processed by processor 14 to obtain a compensation signal. The feedback signal may be representative of a peak voltage during the pulse, a background voltage between pulses, an average voltage, or an instantaneous voltage, taken at any point in the pulse cycle or over multiple cycles. The resulting frequency command is then supplied to a waveform generator 15 which generates the desired waveform, which may optionally be based on a stored or preset pulse profile data input 16, at the commanded frequency to obtain a control signal for the weld power source. If the arc voltage is less than the desired voltage, the feedback loop automatically increases the pulsation frequency, causing the average current and electrode consumption rate to increase, until the arc voltage equals the commanded value. Conversely, if the arc voltage is greater than the desired voltage, the loop automatically decreases the pulsation frequency, causing the consumption rate to decrease, until the arc voltage again equals the commanded value.

The purpose of pulsing the power supply to the electrode is to facilitate control over the size of the molten puddle by controlling the average weld power via pulse frequency and feed rate adjustments. In addition, the power delivered during each pulse controls and maintains the uniform detachment of electrode material, thereby preventing globular and intermittent metal transfer with its attendant weld spatter. The pulse repetition rate or frequency dominates in controlling average power, and therefore the pulsation frequency also dominates the electrode consumption rate. As a result, the pulsation frequency must be closely coordinated with the electrode feed rate, because equilibrium requires that the consumption rate equal the feed rate.

As indicated above, the problem with the conventional frequency based control system is that there is a limited range over which the frequency can be varied. The present invention solves this problem by adding a secondary control loop that tends to return the frequency to its original value by adjusting another arc length related parameter that has the effect of countering changes in the arc voltage. In the preferred embodiment of the invention, for example, the parameter varied is the torch-to-workpiece distance or proximity, although it is also within the scope of the invention to control other arc length and/or position related parameters such as weld seam tracking and scanning parameters involved in scanning of the torch relative to the workpiece. Scanning arrangements to which the principles of the invention may be applied include those disclosed in U.S. Pat. No. 3,818,176 (Brown), U.S. Pat. No. 3,832,522 (Arikawa), U.S. Pat. No. 4,019,016 (Friedman et al.), and U.S. Pat. No. 4,531,192 (Cook).

While the use of proximity feedback control to return a deviant parameter to its desired or original value is disclosed in U.S. Pat. No. 4,794,232 (Kimbrough et al.), the Kimbrough et al. patent concerns systems in which torch proximity is adjusted or controlled in order to return the electrode feed rate or average current to its desired or original value. This is in contrast to the system of the present invention, in which the secondary feedback loop returns pulse frequency to a desired value using a proximity controller to counter pulse frequency variations resulting from changes in the contact-tip voltage (which is often loosely referred to as the arc voltage, even though the arc voltage does not include the voltage drop from the contact-tip to the consumable electrode, and along the consumable electrode to the arc).

In the Kimbrough et al. systems involving pulsation, the width and spacing of the pulses is constantly controlled to supply a predetermined amount of power to the consumable electrode during each cycle, with the width of the pulses being controlled based on the total pulse energy supplied to the electrode, and the interval between pulses being adjusted to control either the average voltage or average current over the previous peak and current base period. This is accomplished by calculating the total energy delivered at peak amps based on the current supplied to the contact tip and the arc voltage so that when the total energy equals a desired pulse energy the system switches to a base current. The duration of the base current is determined either by the average arc voltage over the preceding peak period and present base period or the average current during the preceding peak and current base period.

The three control systems of Kimbrough et al. that include both pulsation and proximity controls have, at least, the disadvantage of being more complicated than the system of the present invention in that they employ three or four control loops, not counting a possible fourth or fifth loop to regulate pulsation current. All three of these systems use a first control loop to regulate pulse energy, as previously described. In addition, one of the systems employs a second loop that adjusts the interval between pulses to regulate average arc current to a desired value, a third loop that adjusts the wire feed rate to maintain or regulate the electrode voltage, and a fourth loop that adjusts proximity to maintain or regulate the wire feed rate to a desired value.

The second and third of the three pulsation systems disclosed by Kimbrough et al. employ a second control loop that adjusts the interval between pulses to regulate average voltage to a desired value. The second system further employs a third loop that adjusts the wire feed rate to maintain or regulate the average arc current, and a fourth loop that adjusts torch proximity to maintain or regulate the wire feed rate to a desired value. Finally, the third system further employs a third loop that adjusts or modulates torch proximity as a way of maintaining or regulating the current to a desired value, not counting a likely fourth loop used to maintain constant feed rate.

Nowhere does Kimbrough et al. use pulse width, pulse amplitude, background amplitude between pulses, or frequency as a control variable in a control loop to regulate arc voltage, much less use only one additional loop to return this control variable to its desired or original value.

In the present invention, the feedback signal for the second loop (e.g., pulsation frequency) can be determined directly from arc current or arc voltage measurements. However, in a further improvement of the present invention, a signal representing the control variable for the first loop is used directly as the feed back signal for the second loop, making direct measurement unnecessary. With this improvement, only one direct measurement is needed, namely contact tip-to-workpiece voltage, in order to control both contact-tip voltage and torch proximity. This is in contrast to the systems of Kimbrough et al. in that each of the Kimbrough et al. systems requires multiple parameter measurements.

The Kimbrough et al. systems also use a recovery condition that averages either voltage or current over only one cycle on a cycle-by-cycle basis, i.e., the average value for each cycle is used to determine the pulse spacing for that particular cycle. Since electric arcs are inherently noisy, the pulse spacing, and therefore the arc length, varies from cycle-to-cycle in response to arc induced noise. In contrast, the present invention is not limited to cycle-by-cycle averaging. Instead, the averaging can be, and is preferably, performed over more than one circle.

In the present invention, it is also preferable to use a plurality of digital signal processors (DSPs) because such processors are ideally suited for performing digital filtering and control, which serve to enhance the signal-to-noise ratio, arc length stability, and control capabilities. In addition, each time the arc voltage control loop digital signal processor updates the pulse parameter control variable or variables, it sends a value or values corresponding to the updated parameter or parameters directly to the second control loop digital signal processor for use as its feedback signal.

Although a number of prior patents refer simply to measurement of the "arc voltage," those skilled in the art will appreciate that the arc voltage is technically only the voltage difference between the end of the electrode and the workpiece over which the arc extends, and not the voltage from the contact tip to the workpiece. The contact tip-to-workpiece voltage differs from the arc voltage due to voltage drops from the contact-tip to the consumable electrode and along the electrode between the end of the contact tip and the arc. Therefore, depending on whether the welding system is a consumable electrode or fixed electrode arc welding system, the voltage measured for the purpose of detecting changes in arc length may either be the electrode-to-workpiece or the contact tip-to-workpiece voltage. For purposes of providing distance related data as inputs to the first feedback loop of the present invention, the electrode-to-workpiece and contact tip-to-workpiece voltages may be considered to be equivalent.

SUMMARY OF THE INVENTION

It is accordingly a first objective of the invention to provide an apparatus and method for improving the stability and accuracy of a pulse frequency (or other pulsation parameter or parameters) controlled arc welding control system by controlling a second parameter in order to bring the pulse frequency (or other pulsation parameter or parameters) back to a commanded value.

It is a second objective of the invention to provide a dual loop control apparatus and method for an arc welding system in which a proximity controller is used to return an adjusted parameter to its desired value without necessarily requiring more than one parameter measurement.

It is a further objective of the invention to provide an apparatus and method of controlling an arc welding system of the type in which the pulse frequency, or other pulsation parameter or parameters, is adjusted to compensate for deviations in a first parameter related to the distance of the contact tip from the workpiece, and in which a second parameter is controlled in order to bring the pulse frequency or other pulsation parameter or parameters back to a commanded or initial value, thereby adding a second feedback loop to the first in order to optimize all parameters having a significant effect on weld quality.

These objectives of the invention are achieved, in accordance with the principles of a preferred embodiment of the invention, by providing an arc welding control method and apparatus in which the conventional weld power source control loop is modified by adding an additional feedback loop employing an electromechanical controller, such as a proximity controller. The faster acting weld power source control loop directly adjusts a pulsation parameter such as the pulse width, pulse amplitude, background amplitude between pulses, or pulse frequency to regulate arc voltage, while the slower control loop adjusts a further parameter to regulate the pulsation parameter and return it to a desired value via the voltage controller's interaction with the arc process. The feedback value for the slower loop may either be the command signal for the pulsation parameter used by the faster loop, or in an existing system in which a command signal for the pulsation parameter is not available, a value that is determined by sensing and processing the actual arc current or arc voltage.

In an illustrated implementation of the preferred embodiment of the invention, the additional or secondary feedback loop adjusts the torch or contact tip-to-workpiece distance using a proximity control motor. In the case of a pulse frequency controller, for example, when the torch-to-work distance begins to increase due to misalignment or changes in workpiece contour encountered as the torch moves along the weld path, the weld power source voltage control loop will decrease the pulse frequency to keep the voltage equal to the voltage command. The slower proximity control will in turn decrease the torch-to-work distance until the voltage control loop returns the frequency to its original value, which corresponds to the original torch-to-work distance, all other parameters remaining constant. Conversely, if the torch-to-work distance attempts to decrease, the weld power source voltage control loop will increase the pulse frequency to hold the voltage equal to the voltage command. The proximity controller will in turn increase the torch-to-work distance until the voltage control loop returns the frequency to its initial value which again corresponds to the original torch-to-work distance.

Although it is possible to use a preset or externally input reference frequency, the preferred embodiment of the invention acquires the reference by locking the position of the torch relative to the workpiece (or using a fixed scanning path) and storing the frequency that results from operation of the primary control loop for use as a reference frequency.

It is also within the scope of the invention to use the voltage control loop in combination with electromechanical or magnetic elements for moving or scanning the torch and/or the arc across the surface of the workpiece in order to gather and store position-related frequency information. When correlated to the motion pattern, this position related information can be further processed and used to control such things as torch proximity, weld-seam tracking, automatic cross-seam oscillation width adjustment, and so forth.

The preferred method of compensating for changes in the arc voltage between the workpiece and the contact tip of a consumable electrode arc welding system or the electrode of other types of arc welding systems includes the steps of supplying a current pulse train having a desired pulsation parameter to the contact tip or electrode in order to establish an arc between the electrode and the workpiece, measuring an electrical parameter of the arc such as the arc voltage and varying the pulsation parameter in response to changes in the electrical parameter, and adjusting a parameter related to electrode or contact tip position in order to cause the pulsation parameter to return to the desired value. Adjustment of the parameter related to electrode or contact tip position is preferably carried by the steps of initially locking the position of the torch, establishing an arc, waiting for the system and pulsation parameter to settle, and storing the resulting pulsation parameter as a reference pulsation parameter. Once the reference pulsation parameter is stored, the position of the torch is unlocked and as the pulsation parameter is subsequently adjusted, it is compared with the stored reference to provide a difference signal which is used as the basis for adjustment of the contact tip or electrode position (conveniently referred to as the torch position) until the torch position and/or other parameters are reset or adjusted by an external input.

DETAILED DESCRIPTION OF THE PREFERRED EMBODIMENTS

Figure 1:
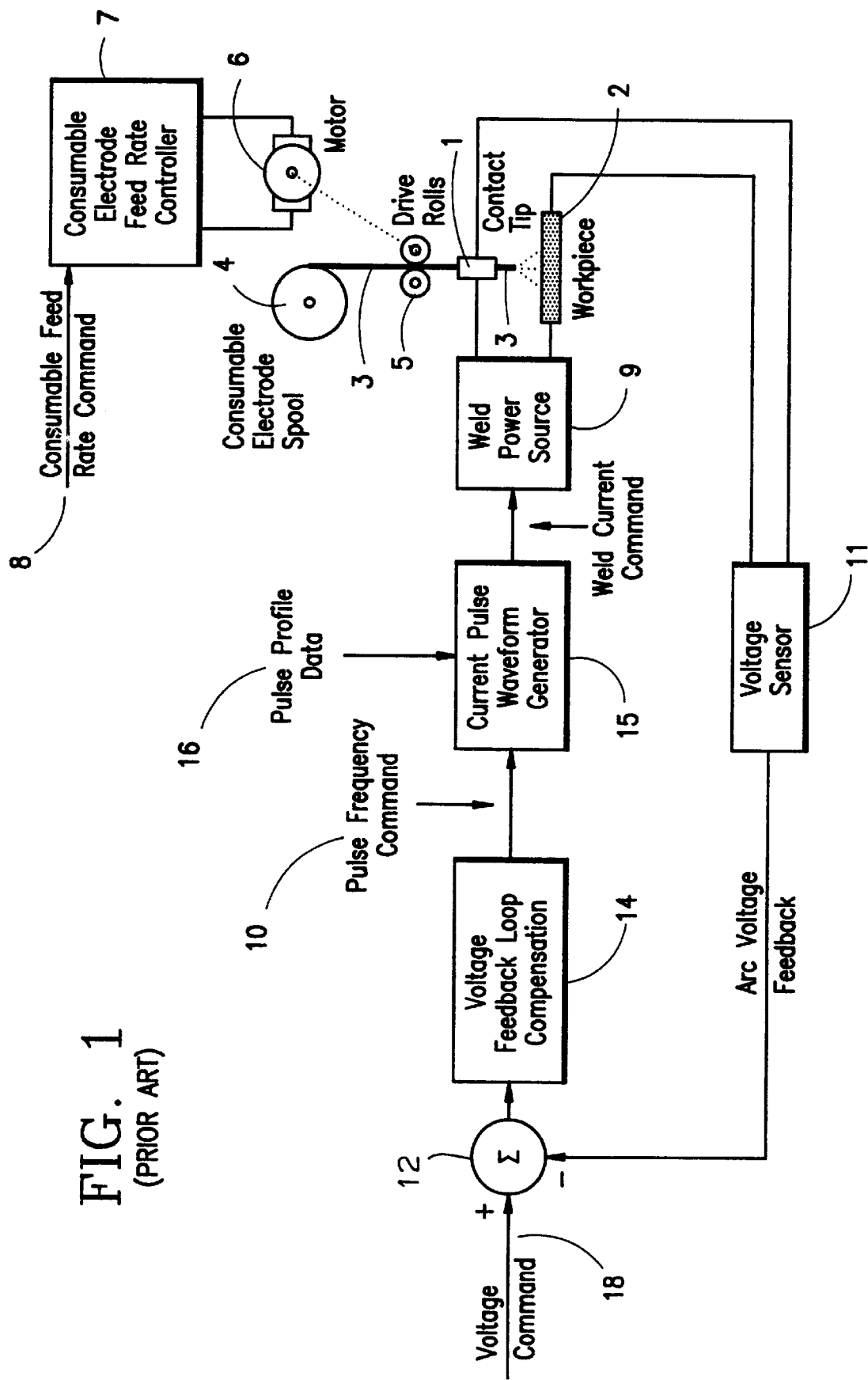
FIG. 1 is a functional block diagram of a conventional consumable electrode arc welding system pulse frequency controller.
Figure 2:
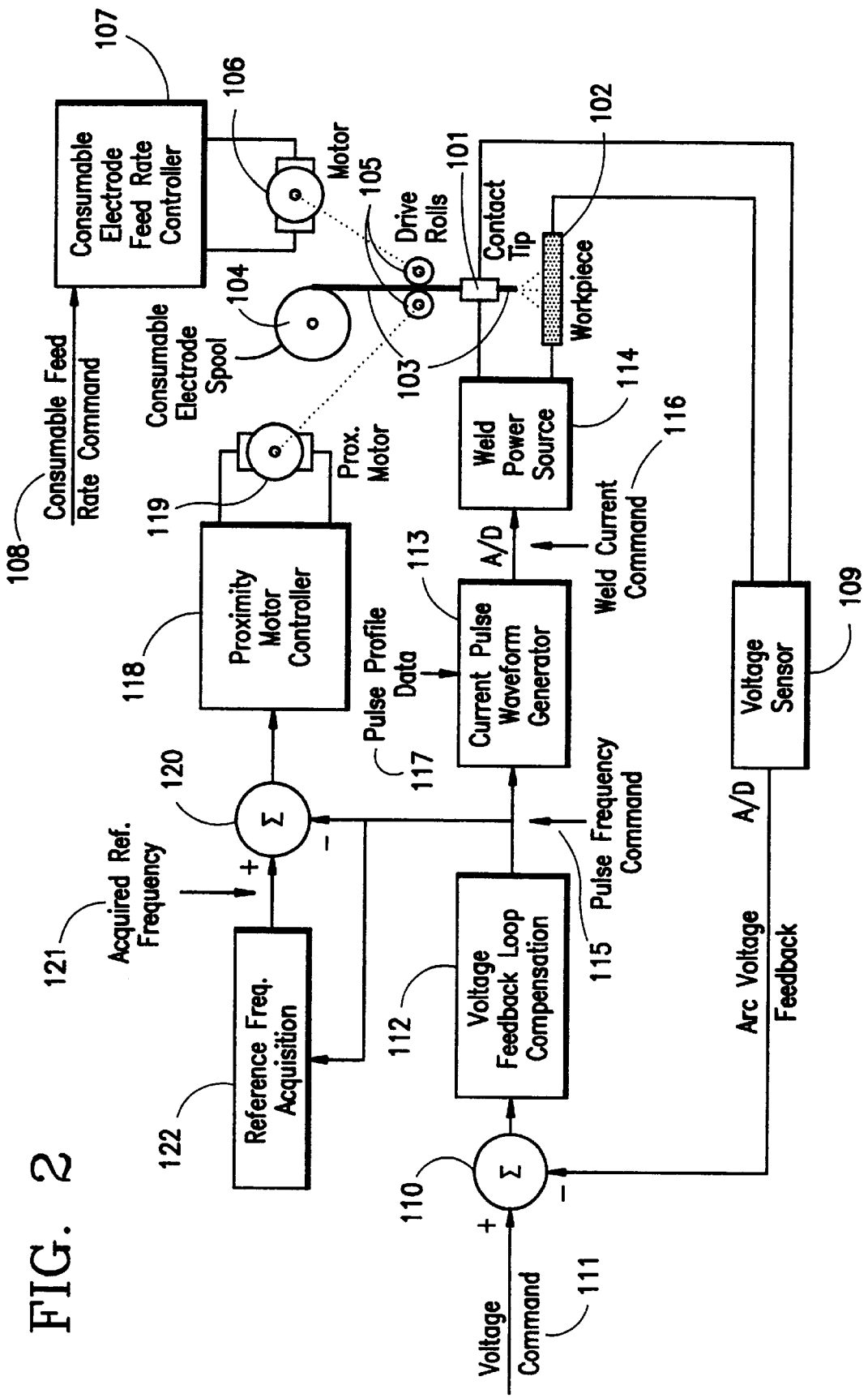
FIG. 2 is a block diagram of a dual loop pulse frequency controller constructed in accordance with the principles of a preferred embodiment of the invention.

As in the conventional controller illustrated in FIG. 1, the pulse frequency controller illustrated in FIG. 2 is arranged to apply a voltage between a contact tip 101 and a workpiece 102, she consumable electrode 103 being continuously fed from a spool 104 towards the workpiece by rollers 105 driven by a motor 106 at a rate corresponding to the rate that material is burned off the tip of the electrode 103 by the applied voltage, so that a constantly controlled amount of material is deposited as the torch containing the contact tip is moved along the weld. A feed rate controller 107 is used to control motor 106 in order to regulate the feed rate in accordance with commands entered manually or by computer via input 108. Power for establishing an arc is provided by a weld power source 114 that delivers electrical power to the electrode 103 via the sliding contact tip 101.

In order to compensate for changes in the arc voltage caused primarily by changes in the distance between the workpiece and the electrode as a result of external factors such as changes in workpiece contour as the torch moves along a weld path, or misalignment of the torch relative to the workpiece, the arc voltage is taken as the input variable to a first feedback loop that adjusts the power supply, and in particular the frequency of pulses generated by the power supply, to increase or decrease the power supplied to the contact tip in response to changes in the arc voltage. The first feedback loop is a voltage feedback loop that includes, as in the prior frequency control systems, a voltage sensor 109 having inputs connected between the contact tip 101 and the workpiece 102. Voltage sensor 109 may be in the form of a differential or isolation amplifier connected to an analog-to-digital converter which periodically samples and converts the amplifier output to digital information for subsequent processing to obtain number representing the arc voltage feedback.

The output of the voltage sensor 109 is supplied to a digital controller which includes an adder 110 that compares the arc voltage with a desired arc voltage input 111. The deviation signal is processed by a compensation circuit or software 112 in the digital controller and supplied to current pulse waveform generator 113 for use in controlling the frequency of pulse signals supplied to the welding power source 114 by varying a nominal frequency command 115. The amplitude and shape of the current pulses may be entered as pulse profile data via input 117, optionally determined using pulse profile data stored in a memory or look-up table, or dynamically adjusted based on additional data inputs or sensors (not shown).

If the average voltage control mode is selected, A/D samples from the voltage sensor are averaged over one or more complete pulsation cycles. If the pulse or minimum voltage control mode is selected, only those A/D samples corresponding to pulse (peak) or background currents in the current waveform are sampled. Additional digital filtering, in accordance with known digital feedback control techniques could also be used to remove the effects of noise and extraneous samples corresponding, for example, to momentary open and short circuits. In either case, the number representing the arc voltage feedback is subtracted from or otherwise compared with a number representing the voltage command, i.e., the desired voltage. The resulting difference or error between the desired and actual values is then processed by the voltage feedback loop compensation or control-law algorithm whose output becomes the pulse frequency command. Those skilled in the art will appreciate that the control law algorithm can be based on any algorithm describing the relationship between pulse frequency and voltage, depending on the mode selected.

The weld power source 114 is designed to deliver weld current in accordance with the weld current command output 116 from the current pulse waveform generator such that the actual weld current closely matches the desired current pulsation waveform. In the preferred embodiment of the invention, the pulse amplitude is definable in microsecond intervals, so that a different value of current can be specified for each microsecond interval of the pulse portion of the waveform. Shorter or larger time increments can be used needed. The actual waveform is generated by reading out the waveform values from a look-up table in which the profile is stored. Those skilled in the art will appreciate, however, that the invention is not limited to a particular manner of defining and generating current pulses.

The pulsation frequency may generated by a computer controlled timer in accordance with the pulse frequency command. For example, the timer can be arranged to signal the computer at the beginning of each pulsation cycle, at which time the computer outputs the look-up table values to a digital-to-analog converter at the corresponding microsecond intervals. Different look-up table values may be provided for each size and type of consumable electrode material, with capabilities of including user definable tables. Whenever the operator or weld program initiates a change, the consumable feed rate command, the voltage command, peak current, peak width, and the background current between pulses must be changed in accordance with the appropriate look-up table, with interpolation being used for values occurring between defined points. In addition, a second timer may be included to precisely time the microsecond intervals, the final value at the end of the pulse corresponding to the background current, and the output remaining at this value until the beginning of the next pulsation cycle when the whole process is repeated. It will of course be appreciated by those skilled in the art that the analog weld current command signal could be replaced by a digital command in case the power supply is capable of reading digital commands.

Even though the first control loop is described in detail, those skilled in the art will appreciate that details of the first control loop may be freely varied within the scope of the invention, so long as the controlling parameter is related to the pulse frequency or some other pulsation parameter such as the pulse duration, pulse amplitude, or background amplitude of the power supply output, and so long as the control parameter is related to the arc voltage, contact-tip voltage, or contact tip-to-workpiece distance. There are, for example, a number of additional ways of taking the arc voltage into account for use in feedback control, and the present invention may use any appropriate measurement protocol, including the integrated magnitude of the arc voltage disclosed in U.S. Pat. No. 4,602,082 (Graville), detection of the base voltage during a time period immediately preceding the onset of a current pulse, as disclosed in U.S. Pat. No. 4,758,707 (Ogilvie), and comparison of the reference or set point voltage with the arc voltage sampled during that portion of the pulsation peak occurring a predetermined duration after the onset of the peak, as disclosed in U.S. Pat. No. 5,157,236 (Batzler). Other potential ways of detecting the arc voltage include averaging over the entire background period, averaging background voltages sampled over multiple pulsation cycles, or basing the arc voltage feedback on peak voltage or an average of peak voltages sampled over one or more pulsation cycles.

In addition, the basic pulse frequency control used in the preferred embodiment of the invention may be varied in the manner disclosed in U.S. Pat. No. 4,438,317 (Ueguri), which discloses methods that use arc voltage feedback to control pulse frequency, pulse duration, and/or other parameters which are also based in part on a wire feed rate command. Another variation of the basic frequency controller to which the principles of the invention may be applicable is found in U.S. Pat. No. 3,728,516 (Daspit), which describes an arrangement in which arc voltage and current are used to control the frequency of pulses supplied to an integrator rather than directly to the electrode, thereby providing a constant current output. The present invention is in principle applicable to any pulse frequency or other pulsation parameter (such as pulse duration, background amplitude between pulses, or pulse amplitude control arrangement in which the pulsation parameter has some relationship to another parameter (such as arc voltage) which is affected by contact tip-to-workpiece distance, including those pulse frequency controls which are also synchronized or related to the consumable electrode feed rate control, as well as to those in which the pulsation parameter is varied in a manner that is not necessarily proportional to the arc voltage.

The secondary feedback loop that returns the pulse frequency to its nominal or desired value may be implemented by either another digital controller or the same digital controller that processes the first feedback loop. The feedback input to the secondary loop is the pulse frequency command supplied to the current pulse waveform generator, while the output is supplied from a proximity motor controller 118 arranged to drive a proximity motor 119 that moves the torch towards or away from the workpiece. Movement of the torch towards or away from the workpiece causes a corresponding change in the arc voltage, which in turn will be reflected in the pulse frequency command that serves as the feedback input to the secondary feedback loop.

The proximity controller can use any suitable control technique to return the frequency to the desired frequency, including proportional-integral-derivative or deadbeat control techniques to process the difference, represented by element 120 in FIG. 2, between actual and reference frequencies such that the torch-to-work distance is adjusted until the actual frequency equals the desired frequency. In an especially preferred embodiment of the invention, the reference frequency (input 121) is acquired by the processor while the torch is locked against movement during initial arc ignition and while the first feedback loop settles. After the settling time elapses, the corresponding pulsation frequency is stored by block 122 and subsequently used as the reference frequency 121 for comparison with actual frequencies obtained when torch movement is unlocked and the proximity controller is activated. Anytime the weld program or equipment operator changes any interacting parameter during welding, the proximity controller is momentarily locked and the acquisition process is repeated. In addition, the operator can also manually jog and readjust the torch-to-work distance, after which the system will reacquire the new reference frequency as soon as the operator ceases adjustment.

Those skilled in the art will appreciate that the voltage control loop can also be used in combination with means (e.g., electromechanical or magnetic) for moving or scanning the torch and/or the arc across the surface of the workpiece in order to gather and store position-related frequency information. When correlated to the motion pattern, this position related information can be further processed and used to control such items as torch proximity, weld-seam tracking, automatic cross-seam oscillation width adjustment, etc., or combinations thereof. As previously mentioned, scanning arrangements to which the principles of the invention may be applied include those disclosed in U.S. Pat. Nos. 3,818,176 (Brown), 3,832,522 (Arikawa), 4,019,016 (Friedman et al.), and 4,531,192 Cook).

As an example, in one of the many possible implementations for combined seam or weld groove tracking and proximity control, the torch is electromechanically oscillated back and forth across a prepare weld groove while simultaneously gathering frequency changes caused by the voltage control loop as it compensates for contact tip-to-work distance changes induced as the arc encounters and moves up and down the weld-groove side walls. The frequency information gathered at the center of the oscillation pattern is used as feedback for a torch proximity controller, and the difference in frequencies gathered at the ends of the oscillation pattern is used to adjust the oscillation centerline in the direction which minimizes the difference. One method for preventing interaction between proximity and centerline adjustments would be to gather frequency information during one cycle of oscillation and then make the proximity and centerline adjustments on the next or alternate cycle.

Figure 3:
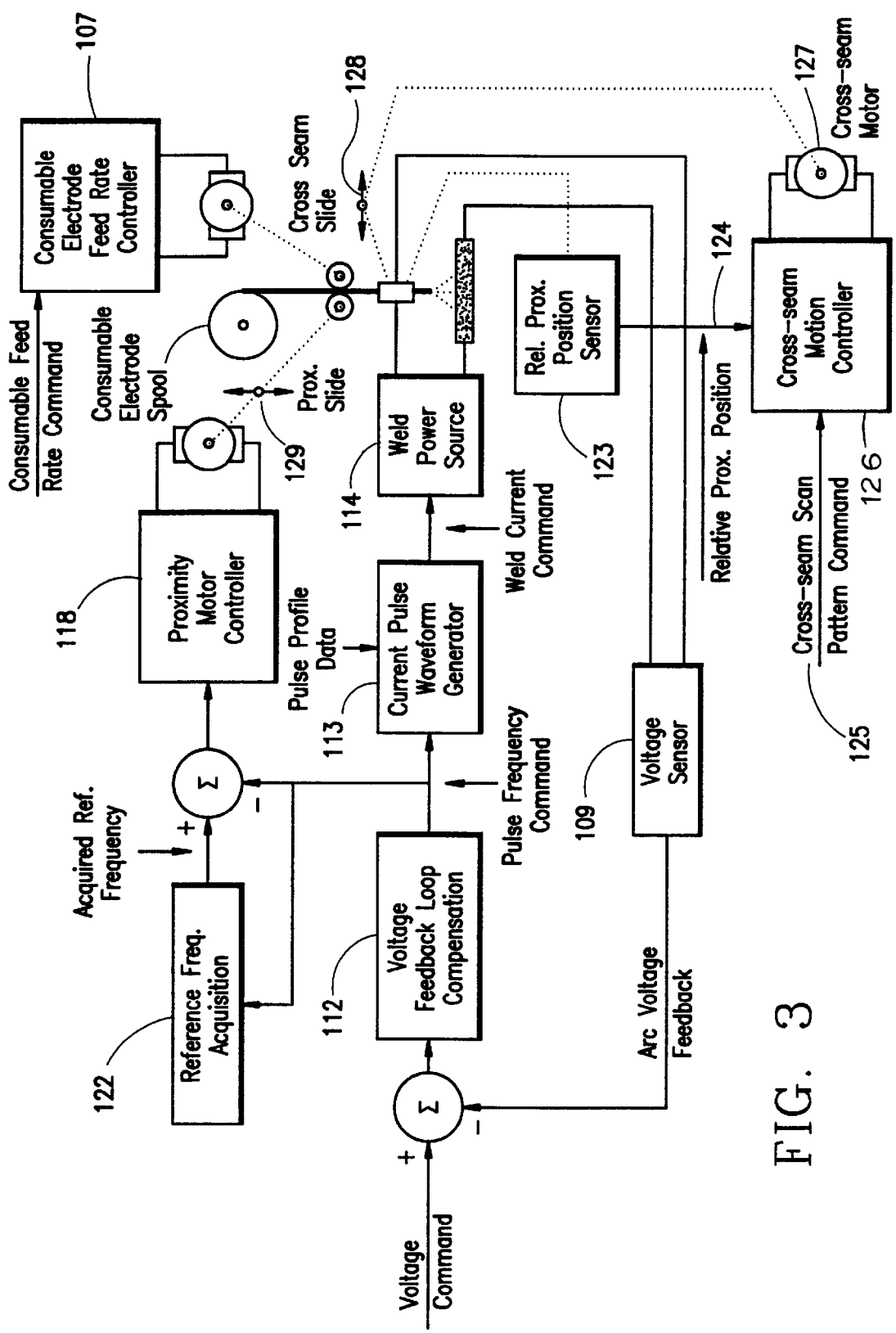
FIG. 3 is a block diagram of a preferred embodiment of the dual loop pulse frequency controller combined with cross-seam scanning to facilitate proximity control, weld groove tracking, and automatic cross-seam oscillation width adjustments to correct for weld groove width and centerline variations.

A preferred embodiment for implementing combined weld groove tracking and proximity control along with automatic oscillation width adjustments to correct for weld groove width variations, is shown in FIG. 3. An electromechanical arrangement including a cross-seam motion controller 126, cross-seam motor 127, and cross-seam slide mechanism 128 is used to oscillate or scan the torch back and forth across a prepared weld groove in accordance with cross-seam pattern command 125, but in this embodiment the proximity controller is allowed to operate continuously. Instead of gathering frequency change data, which through action of the proximity controller would remain virtually unchanged, a relative proximity position sensor 123 (which may be an encoder, synchro, LVDT, potentiometer, or the like) is used to sense the proximity position 124 of the torch relative to the stationary portion of a proximity slide mechanism 129. Then, as the voltage and proximity controllers compensate for contact tip-to-work distance changes resulting from the arc's interaction with the weld-groove side walls, relative proximity positions measured at various points along the oscillation pattern are used to determine and correct for changes in the weld groove width and centerline.

Those skilled in the art will appreciate that the principles of the embodiment illustrated in FIG. 3 and described above can also be applied to single sidewall tracking and other scanning or tracking arrangements, and that the processing arrangement may be varied or extended to include numerous additional features, such as reasonableness checks to discard data that is obviously erroneous.

In addition, the above-described embodiments may be modified or extended to compensate for misalignment and weld groove variations in multiple weld pass situations in which the weld groove sidewalls are virtually obliterated by previous weld passes, i.e., by filling or near filling of the groove. For example, with the addition of a travel position sensor such as an encoder, synchro, or resolver, groove variation and seam tracking correctional data can be recorded as a function of position along the weld path during early weld passes when the sidewall are prominent. This data can then be used or played-back to control final weld passes where sidewall sensing is no longer possible.

Figure 4:
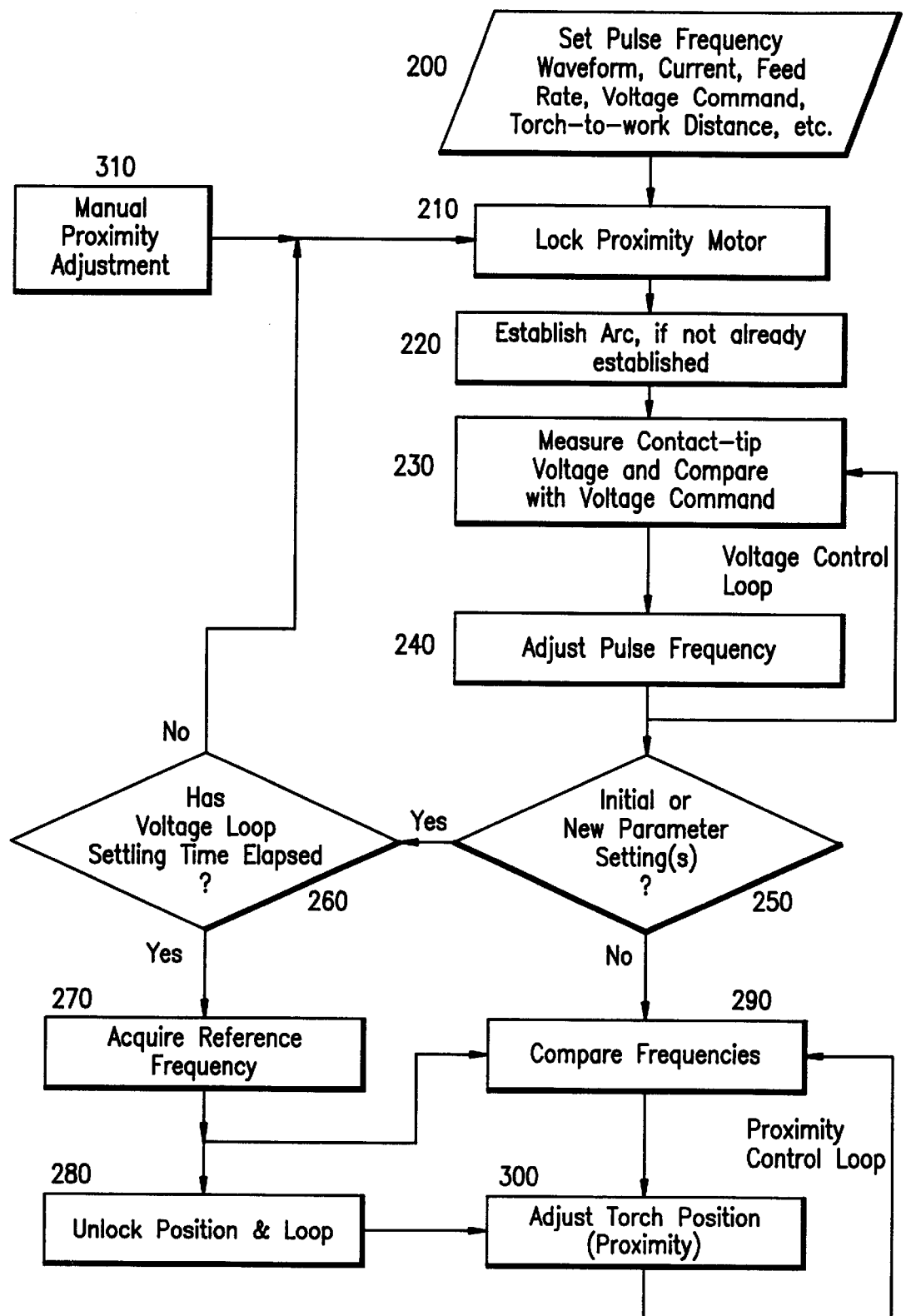
FIG. 4 is a flowchart illustrating a method of controlling pulse frequency using two control loops in accordance with the preferred embodiment of the invention.

As illustrated in FIG. 4, a method of compensating for changes in 4 distance between the contact tip and the workpiece includes the steps of initially setting the pulse frequency, waveform, current, feed rate, voltage command, torch-to-work distance, etc. (step 200), momentarily locking the proximity controller (step 210), supplying a current pulse train having a nominal frequency to a contact tip in a consumable electrode arc welding apparatus in order to establish an arc between the consumable electrode and the workpiece (step 220), measuring and comparing an electrical parameter of the arc, and in particular the contact-tip voltage (step 230), and varying the pulse frequency in response to changes in the electrical parameter (step 240).

Following the initial setting or anytime an interacting parameter such as the arc current or electrode feed rate has been changed, or the proximity is manually adjusted, the proximity controller is momentarily locked, while the system waits for the voltage loop settling time to elapse and then acquires and stores the resulting frequency as the reference frequency (steps 250–270), after which the torch position is unlocked (step 280) and the system adjusts the torch position as necessary by first comparing the stored frequency with the commanded frequency (step 290) and applying the resulting difference signal to a proximity motor controller (step 300) in order to return the frequency to the stored frequency. It will be appreciated by those skilled in the art that it is preferable to loop through and repeat steps 230–240 multiple times before unlocking the torch position (proximity) control loop, and that it is also preferable to filter and average a number of voltage control loop frequency samples and then use the filtered average as the frequency reference for the proximity control loop.

It will also be appreciated by those skilled in the art that the systems of the present invention can be implemented with analog and/or digital controllers, including microprocessors, microcontroller, and digital signal processors. In this respect, it is preferable to use a plurality of digital signal processors because, as previously noted, they are ideally suited for performing digital filtering and control, which serve to enhance signal-to-noise ratios, stability, and control capabilities.

Having thus described preferred embodiments of the invention in sufficient detail to enable those skilled in the art to make and use the invention, it will nevertheless be appreciated that variations and modifications of the illustrated embodiment may be made without departing from the spirit of the invention, and it is intended that the invention not be limited by the above description or accompanying drawings, but that it be defined solely in accordance with the appended claims.

I claim:

1. control apparatus for an arc welding system, comprising:
   a first feedback loop, including:
      a power source electrically arranged to supply electrical power in order to cause an arc to be generated between an electrode and a workpiece, the power source being electrically connected to the electrode by an electrical connection element;
      a sensor arranged to measure a parameter representative of a distance between the electrode or connection element and the workpiece;
      command signal generating circuitry arranged to generate a command signal in response to a difference between a desired parameter and an output of the sensor;
      pulse waveform generating circuitry arranged to cause said power source to generate pulses having at least one pulsation parameter controlled by said command signal such that an output of the sensor is brought into correspondence with said desired parameter; and a second feedback loop, including:
         a second parameter controlling device arranged to control a second parameter;
         a secondary feedback loop controller arranged to control said second parameter controlling device in response to a deviation between a second loop feedback signal representative of said at least one pulsation parameter and a reference signal representative of a desired value for said at least one pulsation parameter.

2. Apparatus as claimed in claim 1, wherein said second parameter is a parameter related to a position of the electrode or connection element relative to the workpiece.

3. Apparatus as claimed in claim 2, wherein said at least one pulsation parameter is selected from the group consisting of pulse width, pulse amplitude, background amplitude between pulses, and frequency.

4. Apparatus as claimed in claim 3, wherein said pulsation parameter is frequency.

5. Apparatus as claimed in claim 1, wherein said at least one pulsation parameter is selected from the group consisting of pulse width, pulse amplitude, background amplitude between pulses, and frequency.

6. Apparatus as claimed in claim 5, wherein said pulsation parameter is frequency.

7. Apparatus as claimed in claim 1, wherein said sensor is a voltage sensor for measuring a voltage between the electrode or connection element and the workpiece.

8. Apparatus as claimed in claim 7, wherein said second parameter controlling device is a proximity motor controller arranged to control a distance of the electrode or connection element from the workpiece.

9. Apparatus as claimed in claim 7, wherein said command signal generating circuitry includes an element arranged to compare the output of the voltage sensor with a desired voltage.

10. Apparatus as claimed in claim 7, wherein said voltage sensor is arranged to sense either peak voltage during a pulse, background voltage between pulses, or an average voltage averaged during at least one pulsation period.

11. Apparatus as claimed in claim 7, wherein said voltage sensor includes an analog-to-digital converter, and said command signal and waveform generating circuitry are included in a digital processor.

12. Apparatus as claimed in claim 1, wherein said second feedback loop feedback signal is said command signal.

13. Apparatus as claimed in claim 1, wherein the device arranged to control the second parameter is a proximity motor controller arranged to control a distance of the electrode or connection element from the workpiece.

14. Apparatus as claimed in claim 1, further comprising a consumable electrode and a drive arrangement for feeding the consumable electrode into the arc to cause material to be transported from the consumable electrode to the workpiece, said connection element being a contact tip in sliding engagement with the consumable electrode.

15. Apparatus as claimed in claim 1, wherein said pulse waveform generator has as one input said command signal and as a second input a pulse profile data input.

16. Apparatus as claimed in claim 15, wherein said pulse profile data is supplied by a look-up table.

17. Apparatus as claimed in claim 1, further comprising a device arranged to scan or oscillate the connection element or electrode across a surface of the workpiece in order to gather position-related, pulsation-parameter information, said information being correlated with a scan or oscillation pattern in order to adjust said second parameter.

18. Apparatus as claimed in claim 17, wherein said device is is further arranged to use said gathered information to control a position of the connection element or electrode across and along a surface of the workpiece in accord with a desired positional relationship.

19. Apparatus as claimed in claim 17, wherein said second parameter is a proximity of the connection element or electrode relative to the workpiece and wherein said proximity is controlled on the basis of information gathered when said connection element or electrode is within a predefined portion of said scan or oscillation pattern.

20. Apparatus as claimed in claim 19, wherein said device is further arranged to use differences between said information gathered at ends of said scan or oscillation pattern to adjust a scan or oscillation centerline in a direction which minimizes the differences.

21. Apparatus as claimed in claim 17, wherein said second parameter is a distance of the workpiece to the connection element or electrode, and said device is further arranged to gather and use differences in said distance correlated to a scan or oscillation pattern to control the position of the connection element or electrode across and along a surface of the workpiece in accord with a desired positional relationship.

22. Apparatus as claimed in claim 17, wherein said second parameter is a distance of the workpiece to the connection element or electrode, and said device is further arranged to use differences in said distance to determine and correct for changes in weld groove width and centerline.

23. Apparatus as claimed in claim 1, wherein said control apparatus includes at least one digital signal processor incorporating digital filtering and control algorithms arranged to enhance signal-to-noise ratios, stability, and control capabilities.

24. Control apparatus for an arc welding system, comprising:
    a first feedback loop, including:
        a power source electrically arranged to supply electrical power in order to cause an arc to be generated between an electrode and a workpiece, the power source being electrically connected to the electrode by an electrical connection element;
        a voltage sensor arranged to measure a voltage difference between the electrode or connection element and the workpiece;
        command signal generating circuitry arranged to generate a command signal in response to a difference between a desired voltage and an output of the voltage sensor;
        current pulse waveform generating circuitry arranged to cause said power source to generate current pulses having at least one pulsation parameter controlled by said command signal such that an output of the voltage sensor is brought into correspondence with said desired voltage; and
    a second feedback loop, including:
        a second parameter controlling device arranged to control a second parameter;
        a secondary feedback loop controller arranged to control said second parameter controlling device in response to a deviation between a second loop feedback signal representative of said at least one pulsation parameter and a reference signal representative of a desired value for said at least one pulsation parameter.

25. Apparatus as claimed in claim 24, wherein said second parameter is a parameter related to a position of the electrode or connection element relative to the workpiece.

26. Apparatus as claimed in claim 24, wherein said second loop feedback signal is developed directly from said command signal.

27. Apparatus as claimed in claim 24, wherein said at least one pulsation parameter is selected from the group consisting of pulse width, pulse amplitude, background amplitude between peaks, and frequency.

28. Apparatus as claimed in claim 27, wherein said pulsation parameter is frequency.

29. Apparatus as claimed in claim 24, wherein said second parameter controlling device is a proximity motor controller arranged to control a distance of the electrode or connection element from the workpiece.

30. Apparatus as claimed in claim 24, wherein said voltage sensor is arranged to sense either peak voltage during a pulse, background voltage between pulses, or an average voltage averaged during at least one pulsation period.

31. Apparatus as claimed in claim 24, wherein said voltage sensor includes an analog-to-digital converter, and said command signal and waveform generating circuitry are included in a digital processor.

32. Apparatus as claimed in claim 24, further comprising a consumable electrode and a drive arrangement for feeding the consumable electrode into the arc to cause material to be transported from the consumable electrode to the workpiece, said connection element being a contact tip in sliding engagement with the consumable electrode.

33. Apparatus as claimed in claim 24, wherein said current pulse waveform generating circuitry has as one input said command signal and as a second input pulse profile data.

34. Apparatus as claimed in claim 33, wherein said pulse profile data is supplied by a look-up table.

35. Apparatus as claimed in claim 24, further comprising a device arranged to scan or oscillate the connection element or electrode across a surface of the workpiece in order to gather position-related, pulsation-parameter information, said information being correlated with a scan or oscillation pattern in order to adjust said second parameter.

36. Apparatus as claimed in claim 35, wherein said device is further arranged to use said gathered information to control a position of the connection element or electrode across and along a surface of the workpiece in accord with a desired positional relationship.

37. Apparatus as claimed in claim 35, wherein said second parameter is a proximity of the connection element or electrode relative to the workpiece and wherein said proximity is controlled on the basis of information gathered when said connection element or electrode is within a predefined portion of said scan or oscillation pattern.

38. Apparatus as claimed in claim 37, wherein said device is further arranged to use differences between said information gathered at ends of said scan or oscillation pattern to adjust a scan or oscillation centerline in a direction which minimizes the differences.

39. Apparatus as claimed in claim 35, wherein said second parameter is a distance of the workpiece to the connection element or electrode, and said device is further arranged to gather and use differences in said distance correlated to the scan or oscillation pattern to control a position of the connection element or electrode across and along a surface of the workpiece in accord with a desired positional relationship.

40. Apparatus as claimed in claim 35, wherein said second parameter is a distance of the workpiece to the connection element or electrode, and said device is further arranged to use differences in said distance to determine and correct for changes in weld groove width and centerline.

41. Apparatus as claimed in claim 24, wherein said control apparatus includes at least one digital signal processor incorporating digital filtering and control algorithms arranged to enhance signal-to-noise ratios, stability, and control capabilities.

42. An arc welding method, comprising the steps of:
supplying an electrical pulse train having pulsation parameters to the electrode or connection element in order to establish an arc between the electrode and the workpiece;
measuring an electrical parameter of the arc representative of a distance between the electrode or connection element and the workpiece;
varying at least one of the pulsation parameters in response to changes in the electrical parameter such that the electrical parameter is brought into correspondence with a desired parameter; and
adjusting an additional parameter in order to cause the at least one of the pulsation parameters to return to a desired value.

43. A method as claimed in claim 42, wherein the additional parameter is a parameter related to a position of the electrode or connection element relative to the workpiece.

44. A method as claimed in claim 43, wherein the at least one of the pulsation parameters is selected from the group consisting of pulse width, pulse amplitude, background amplitude between pulses, and frequency.

45. A method as claimed in claim 44, wherein the at least one of the pulsation parameters is frequency.

46. A method as claimed in claim 42, wherein the at least one of the pulsation parameters is selected from the group consisting of pulse width, pulse amplitude, background amplitude between pulses, and frequency.

47. A method as claimed in claim 46, wherein the at least one of the pulsation parameters is frequency.

48. A method as claimed in claim 42, wherein the step of measuring the electrical parameter comprises the step of measuring the voltage between the electrode or connection element and the workpiece.

49. A method as claimed in claim 42, wherein the step of adjusting the additional parameter comprises the step of electro-mechanically adjusting a distance of the electrode or connection element from the workpiece.

50. A method as claimed in claim 49, wherein the step of adjusting the parameter related to electrode or connection element distance comprises the step of comparing a commanded pulsation parameter with a reference representative of said desired value of said at least one pulsation parameter.

51. A method as claimed in claim 50, further comprising the step of automatically acquiring a reference representative of the desired value of said at least one pulsation parameter by momentarily locking the position of the electrode or connection element relative to the workpiece, followed by the steps of supplying an electrical pulse train having desired pulsation parameters to the electrode or connection element in a consumable electrode arc welding apparatus in order to establish an arc between the electrode and the workpiece; measuring an electrical parameter of the arc; and varying one of the pulsation parameters in response to changes in the electrical parameter until the one of the pulsation parameters settles; subsequently storing the varied pulsation parameters for use as the reference pulsation parameter, and unlocking the position of the electrode or connection element relative to the workpiece.

52. A method as claimed in claim 42, further comprising the steps of scanning or oscillating the connection element or electrode across a surface of the workpiece in order to gather position-related, pulsation-parameter information; and correlating said information with a scan or oscillation pattern in order to adjust said additional parameter.

53. A method as claimed in claim 52, wherein said additional parameter is a proximity of the connection element or electrode relative to the workpiece and wherein said proximity is adjusted on the basis of said information gathered when said connection element or electrode is within a predefined portion of said scan or oscillation pattern.

54. A method as claimed in claim 53, further comprising the step of using differences between said information gathered at ends of said scan or oscillation pattern to adjust a scan or oscillation centerline in a direction which minimizes the differences.

55. A method as claimed in claim 52, wherein said additional parameter is a distance of the workpiece to the connection element or electrode, and further comprising the step of using differences in said distance to determine and correct for changes in weld groove width and centerline.

56. A method as claimed in claim 52, further comprising the step of using said gathered information to control a position of the connection element or electrode across and along a surface of the workpiece in accord with a desired positional relationship.

57. A method as claimed in claim 52, wherein said additional parameter is a distance of the workpiece to the connection element or electrode, and further comprising the steps of gathering and using differences in said distance correlated to said scan or oscillation pattern to control the position of the connection element or electrode across and along a surface of the workpiece in accord with a desired positional relationship.

* * * * *

UNITED STATES PATENT AND TRADEMARK OFFICE
CERTIFICATE OF CORRECTION

PATENT NO. : 6,335,511 B1  Page 1 of 1
DATED : January 1, 2002
INVENTOR(S) : Ronald R. Rothermel It is certified that error appears in the above-identified patent and that said Letters Patent is hereby corrected as shown below:

Column 2,
Line 12, change "to" to -- so --.

Column 8,
Lines 25 and 26, insert -- if -- after "used".

Column 11,
Line 12, delete "4".

Signed and Sealed this

Tenth Day of September, 2002

Attest:

JAMES E. ROGAN
Attesting Officer  Director of the United States Patent and Trademark Office